United States Patent
Johnson et al.

(10) Patent No.: US 7,590,574 B2
(45) Date of Patent: Sep. 15, 2009

(54) MECHANIZED TAX WORKSHEET

(75) Inventors: Ronnie Dale Johnson, Birmingham, AL (US); Joseph M. Hanners, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 95 days.

(21) Appl. No.: 11/613,184

(22) Filed: Dec. 19, 2006

(65) Prior Publication Data

US 2007/0208636 A1 Sep. 6, 2007

Related U.S. Application Data

(63) Continuation of application No. 09/588,534, filed on Jun. 7, 2000, now Pat. No. 7,155,404.

(51) Int. Cl.
*G07F 19/00* (2006.01)
(52) U.S. Cl. .......................................... 705/34; 705/31
(58) Field of Classification Search .................. 705/31, 705/40, 19, 34, 16
See application file for complete search history.

(56) References Cited

U.S. PATENT DOCUMENTS

| | | | |
|---|---|---|---|
| 5,987,429 A | 11/1999 | Maritzen et al. | |
| 6,078,898 A | 6/2000 | Davis et al. | |
| 6,266,401 B1 * | 7/2001 | Marchbanks et al. | 379/116 |
| 6,360,208 B1 | 3/2002 | Ohanian et al. | |
| 7,155,404 B1 | 12/2006 | Johnson et al. | |
| 2002/0026394 A1 * | 2/2002 | Savage et al. | 705/34 |
| 2003/0191701 A1 | 10/2003 | Haseltine et al. | |
| 2003/0233296 A1 | 12/2003 | Wagner | |
| 2004/0133487 A1 | 7/2004 | Hanagan et al. | |
| 2005/0033671 A1 | 2/2005 | Hahn-Carlson | |

FOREIGN PATENT DOCUMENTS

WO WO 97/28637 * 8/1997

OTHER PUBLICATIONS

"Docucorp 'Goes Live' With Billing Services for Idaho Power; Utility Introduces New Bills to Customers Via Video News Release"; PR Newswire, New York; Dec. 2, 1999. p. 1.*
Office Action dated Nov. 6, 2003; U.S. Appl. No. 10/346,101.
Office Action dated Nov. 26, 2004, U.S. Appl. No. 10/346,101.

(Continued)

*Primary Examiner*—Elaine Gort
(74) *Attorney, Agent, or Firm*—Jennifer Pearson Medlin; Morris Manning & Martin LLP

(57) ABSTRACT

A system and method for verifying charges on a customer bill includes a computers for downloading, from a mainframe computer, to a local server billing data associated with a customer account, populating a database with a portion of the billing data, performing pre-calculation functions on another portion of the billing data and populating the database with results of the pre-calculation functions, displaying predetermined categories of information stored in the database, calculating the taxes for each of several charges in the billing data and storing tax results in the database, and comparing the tax results with tax information on the customer bill.

9 Claims, 6 Drawing Sheets

OTHER PUBLICATIONS

Office Action dated Jul. 2, 2003; U.S. Appl. No. 10/346,101.
Office Action dated Jun. 17, 2004: U.S. Appl. No. 10/346,101.
Office Action dated Aug. 24, 2005; U.S. Appl. No, 09/996,806.
Office Action dated Mar. 11, 2005; U.S. Appl. No. 09/996,806.

* cited by examiner

| | MECHANIZED TAX WORKSHEET INPUT (DALE JOHNSON) | _ □ X |

MTW  OPERATIONS  RCATS  SETTINGS  ABOUT

| ACCOUNT NUMBER: | TAX CODES: | REMARKS | | CALCULATE | | ERASE ALL |
| (270) 683-XXXX 140 | NNNN | AUTO-FILL |
| RESIDENCE/BUSINES: | BILL DATE: | EDIT MODE | | REVIEW | | EXIT MTW |
| RESIDENCE | 2/7/00 | RCATS |

| | TYPE | ENTITY | TAR/GEO | REMARK | FROM | THRU | A/C | RATE |
|---|---|---|---|---|---|---|---|---|
| 1 | R | AOO100 | 113830 | 1FRCL | | | 110 | 13.69 |
| 2 | R | AOO100 | 113830 | TTR | | | DJ3 | 0.00 |
| 3 | R | AOO100 | 113830 | BCR | | | DJ3 | 0.00 |
| 4 | R | AOO100 | 113830 | BRD | | | DJ3 | 0.00 |
| 5 | R | AOO100 | 113830 | LNPCX | | | LNB | 0.35 |
| 6 | R | AOO100 | 113830 | NXMCR | | | DJ3 | 7.50 |
| 7 | R | AOO100 | 113830 | AH8KC | | | KY1 | 0.07 |
| 8 | RU | AOO100 | 113830 | SEQ1X | | | EQ0 | 3.95 |
| 9 | R | AOO100 | 113830 | TDG | | | DC3 | 0.25 |
| 10 | R | AOO100 | 113830 | 8SCRB | | | DD5 | 0.03 |
| 11 | R | AOO100 | 113830 | 9LM | | | EX0 | 3.50 |
| 12 | F | AOO100 | 113830 | VR3CL | 1/27/00 | 2/27/00 | 110 | -17.00 |
| 13 | F | AOO100 | 113830 | VSB | 1/27/00 | 2/27/00 | DJ3 | -16.50 |
| 14 | F | AOO100 | 113830 | 1FRCL | 1/27/00 | 2/27/00 | 110 | 13.69 |
| 15 | F | AOO100 | 113830 | NXMCR | 1/27/00 | 2/27/00 | DJ3 | 7.50 |
| 16 | F | AOO100 | 113830 | 8SCRB | 12/31/99 | 2/27/00 | DD5 | -0.02 |
| 17 | RU | AOO100 | 113830 | E911 | | | T41 | 0.40 |
| 18 | D | AOO100 | 113830 | DA | | | R30 | 0.85 |
| 19 | T | AOO100 | 113830 | TOOL | | | T10 | 11.84 |
| 20 | T | AOO100 | 113830 | BULK | | | T10 | -1.18 |

WAITING FOR YOUR NEXT MOVE

FIG. 2

MECHANIZED TAX WORKSHEET: KENTUCKY

DALE JOHNSON (YGQMRBF)

ACCOUNT NUMBER: (270) 683-XXXX 140    BILL DATE: 02/07/00    TAX CODES: NNNN

| CARRIER ID | GROUP | TAR/GEO | TYPE | FROM | THRU | A/C | TAX | STATUS | RATE |
|---|---|---|---|---|---|---|---|---|---|
| A00100 | MONTHLY | 113830 | R | | | 110 | | TTNNTN | 13.69 |
| | | | R | | | DJ3 | | TTNNTN | 0.00 |
| | | | R | | | DJ3 | | TTNNTN | 0.00 |
| | | | R | | | DJ3 | | TTNNTN | 0.00 |
| | | | R | | | LNB | | TNNNNN | 0.35 |
| | | | R | | | DJ3 | | TTNNTN | 7.50 |
| | | | R | | | KY1 | | NNNNNN | 0.07 |
| | | | RU | | | EQ0 | | NNNNNN | 3.95 |
| | | | R | | | DC3 | | NTNNNN | 0.25 |
| | | | R | | | DD5 | | NNNNNN | 0.03 |
| | | | R | | | EX0 | | TNNNNN | 3.50 |
| | | | RU | | | T41 | | NNNNNN | 0.40 |
| A00100 | OC&C | 113830 | F | 1/27/00 | 2/27/00 | 110 | | TTNNTN | -17.00 |
| | | | F | 1/27/00 | 2/27/00 | DJ3 | | TTNNTN | -16.50 |
| | | | F | 1/27/00 | 2/27/00 | 110 | | TTNNTN | 13.69 |
| | | | F | 1/27/00 | 2/27/00 | DJ3 | | TTNNTN | 7.50 |
| | | | F | 12/31/99 | 2/27/00 | DD5 | | NNNNNN | -0.02 |
| | | | D | | | R30 | | TTNNTN | 0.85 |
| A00100 | TOOLS | 113830 | T | | | T10 | | TTNNTN | 11.84 |
| | | | T | | | T10 | | TTNNTN | -1.18 |
| C0022B | IDB | 0 | I | | | | | NNNNNN | 10.95 |

FIG. 3

TAX CALCULATION RESULTS: KENTUCKY    DALE JOHNSON (YGQMRBF)
ACCOUNT NUMBER: (270) 683-XXXX 140    BILL DATE: 02/07/00

| TAR/GEO | TYPE | FROM | THRU | A/C | STATUS | RATE | AMT | TAX | FED | STATE | COUNTY | CITY | FRAN | GR |
|---|---|---|---|---|---|---|---|---|---|---|---|---|---|---|
| 113830 | R | | | 110 | TTNNTHN | 13.69 | 13.69 | | T | T | --- | --- | T | --- |
| | R | | | LNB | TNNNNN | 0.35 | .35 | | T | --- | --- | --- | --- | --- |
| | R | | | DJ3 | TTNNTN | 7.50 | 7.50 | | T | T | --- | --- | T | --- |
| | R | | | KY1 | NNNNNN | 0.07 | .07 | | --- | --- | --- | --- | --- | --- |
| | R | | | DC3 | NTNNNN | 0.25 | .25 | | --- | T | --- | --- | --- | --- |
| | R | | | DD5 | NNNNNN | 0.03 | .03 | | --- | --- | --- | --- | --- | --- |
| | R | | | EX0 | TNNNNN | 3.50 | 3.50 | | T | --- | --- | --- | --- | --- |
| REG | | A00100 | MONTHLY | | | | 25.39 | 2.692 | .770 | 1.286 | .000 | .000 | .636 | .000 |
| 113830 | RU | | | EQ0 | NNNNNN | 3.95 | 3.95 | | --- | --- | --- | --- | --- | --- |
| | RU | | | T41 | NNNNNN | 0.40 | .40 | | --- | --- | --- | --- | --- | --- |
| UNREG | | A00100 | MONTHLY | | | | 4.35 | 0.000 | .000 | .000 | .000 | .000 | .000 | .000 |
| 113830 | F | 1/27/00 | 2/6/00 | 110 | TTNNTN | -17.00 | -5.67 | | T | T | --- | --- | T | --- |
| | F | 1/27/00 | 2/6/00 | DJ3 | TTNNTN | -16.50 | -5.50 | | T | T | --- | --- | T | --- |
| | F | 1/27/00 | 2/6/00 | 110 | TTNNTN | 13.69 | 4.56 | | T | T | --- | --- | T | --- |
| | F | 1/27/00 | 2/6/00 | DJ3 | TTNNTN | 7.50 | 2.50 | | T | T | --- | --- | T | --- |
| | F | 12/31/99 | 2/6/00 | DD5 | NNNNNN | -0.02 | -.02 | | --- | --- | --- | --- | --- | --- |
| | D | | | R30 | TTNNTN | 0.85 | .85 | | T | T | --- | --- | T | --- |
| REG | | A00100 | OC&C | | | | -3.28 | -0.393 | -.101 | -.195 | .000 | .000 | -.098 | .000 |
| 113830 | T | | | T10 | TTNNTN | 11.84 | 11.84 | | T | T | --- | --- | T | --- |
| | T | | | T10 | TTNNTN | -1.18 | -1.18 | | T | T | --- | --- | T | --- |
| REG | | A00100 | TOOLS | | | | 10.66 | 1.289 | .329 | .640 | .000 | .000 | .320 | .000 |
| | | A00100 | REG | | | 36.36 | 32.77 | 3.59 | .999 | 1.731 | .000 | .000 | .858 | .000 |
| | | A00100 | UNREG | | | 4.35 | 4.35 | 0.00 | .000 | .000 | .000 | .000 | .000 | .000 |
| TOTAL REG | | | | | | | | 3.59 | .999 | 1.731 | .000 | .000 | .858 | .000 |
| TOTAL UNREG | | | | | | | | 0.00 | .000 | .000 | .000 | .000 | .000 | .000 |
| TOTAL BILLED | | | | | | 40.71 | 37.12 | 3.59 | 1.00 | 1.73 | .00 | .00 | .86 | .00 |

FIG. 4

SUMMARY SHEET: KENTUCKY
DALE JOHNSON (YGQMRBF)

ACCOUNT NUMBER: (270) 683-XXXX 140

BILL DATE: 2/7/00

| | A00100 | C0022B | | | | TOTAL |
|---|---|---|---|---|---|---|
| PAST DUE AMOUNT | 0.00 | 0.00 | | | | |
| REGULATED PAGES: | | | | | | |
| MONTHLY SERVICE CHARGES | | | | | | |
|   TOTAL MONTHLY SERVICES | 25.39 | 0.00 | | | | |
| LOCAL USAGE SUMMARY | | | | | | |
|   TOTAL LOCAL USAGE CHARGES | 0.00 | 0.00 | | | | |
| OTHER CHARGES AND CREDITS | | | | | | |
|   TOTAL OC&C | -3.28 | 0.00 | | | | |
| ITEMIZED CALLS | | | | | | |
|   TOTAL ITEMIZED CALLS | 10.66 | 0.00 | | | | |
| REGULATED TAXES | | | | | | |
| • FEDERAL | 1.00 | 0.00 | | | | |
| • STATE/LOCAL | 1.73 | 0.00 | | | | |
| • SCHOOL | 0.86 | 0.00 | | | | |
|     TOTAL REGULATED TAXES | 3.59 | 0.00 | | | | |
| OTHER STATES TAXES | 0.00 | 0.00 | | | | |
| PRE-TAXED TOOLS (IDB) | 0.00 | 10.95 | | | | |
| TOTAL REGULATED CHARGES | 36.36 | 10.95 | | | | |

FIG. 5A

SUMMARY SHEET: KENTUCKY
DALE JOHNSON (YGQMRBF)

ACCOUNT NUMBER: (270) 683-XXXX 140

BILL DATE: 2/7/00

| | A00100 | C0022B | | | | TOTAL |
|---|---|---|---|---|---|---|
| NONREGULATED PAGES: | | | | | | |
| MONTHLY SERVICE CHARGES | | | | | | |
|   TOTAL MONTHLY SERVICES | 4.35 | 0.00 | | | | |
| LOCAL USAGE SUMMARY | | | | | | |
|   TOTAL LOCAL USAGE CHARGES | 0.00 | 0.00 | | | | |
| OTHER CHARGES AND CREDITS | | | | | | |
|   TOTAL OC&C | 0.00 | 0.00 | | | | |
| ITEMIZED CALLS | | | | | | |
|   TOTAL ITEMIZED CALLS | 0.00 | 0.00 | | | | |
| NONREGULATED TAXES | | | | | | |
|   • FEDERAL | 0.00 | 0.00 | | | | |
|   • STATE/LOCAL | 0.00 | 0.00 | | | | |
|   • SCHOOL | 0.00 | 0.00 | | | | |
|     TOTAL NONREGULATED TAXES | 0.00 | 0.00 | | | | |
| PRE-TAXED TOOLS (IDB) | 0.00 | 0.00 | | | | |
| TOTAL NONREGULATED CHARGES | 4.35 | 0.00 | | | | |
| TOTAL BILL | 40.71 | 10.95 | | | | 51.66 |
| TOTAL ON BILL | 0.00 | 0.00 | | | | |

FIG. 5B

MECHANIZED TAX WORKSHEET

This application is a continuation of application Ser. No. 09/588,534, filed on Jun. 7, 2000 now U.S. Pat. No. 7,155,404, and entitled MECHANIZED TAX WORKSHEET.

BACKGROUND

1. Field of the Invention

The present invention is directed to data verification. More particularly, the present invention is directed to verifying the accuracy of charges on customer bills before the customer bills are sent to the respective customers.

2. Background of the Invention

Large utility companies such a regional telephone companies must generate and mail thousands, and typically millions, of customer bills each month. Typically, bills are generated in batches on a mainframe computer that stores customer and account information. For each batch or billing cycle, the mainframe computer collects the relevant charges for each customer, calculates appropriate taxes, tariffs and/or other charges, and organizes these several elements into a format that can be printed and understood by a customer.

Telecommunications service billing, and particularly telephone service billing, is especially complicated. Using a residential telephone customer as an example, one of the only charges on the bill that remains relatively constant from month to month, or even from customer to customer, is a monthly service charge that all residential customers must pay. However, there are a host of additional charges that are included in a typical telephone bill including premium services such as call waiting and call forwarding services, emergency 911 charges, late payment charges, long distance (toll) charges and bulk item charges such as directory assistance. Furthermore, telephone companies typically serve customers in several jurisdictions including cities, counties, and states, each having its own unique taxing, tariff and/or surcharge paradigm that may be applied in unique ways to the several services charged to a customer's account.

In view of the complexity of the several taxes, tariffs and surcharges that may be applicable to a customer's account, it is not uncommon for errors to appear on customer bills. Accordingly, large enterprises, such as telephone companies, often establish a department that is charged with reviewing the accuracy of customer bills before the bills are sent (e.g., mailed) to customers. This review process amounts to a "sanity check" on the output of the mainframe computer that is running complex computer algorithms that calculate and, presumably, properly apply the appropriate taxing and charging schemes to the individual customer accounts. Thus, bill verification typically involves obtaining a sample of all or a batch of bills, and preferably at least a sample from each major jurisdiction, e.g., a state, reviewing those bills, and verifying them for elements such as taxes and fractionalization of other charges and credits (OC&Cs).

The bill verification function is particularly important where the mainframe computing function is performed by an outside contractor or consultant, i.e., the function is outsourced. In such a situation there is significantly less oversight of the overall billing process, thereby leading, potentially, to increased billing errors and thus increased customer dissatisfaction and complaints. There may also be legal ramifications if customer bills are grossly erroneous.

The conventional method of conducting bill verification is to manually review each sample or "hold" bill, manually identify each of the charges on the bill that is subject to taxation, for example, manually calculate the taxes for each charge by using tax tables, manually calculate a sum for the charges and compare that sum to the data on the "hold" bill. These manual procedures, however, are extremely slow, tedious and prone to errors.

SUMMARY OF THE INVENTION

To address the urgency of bill verification and to avoid the drawbacks of conventional manual bill verification, the present invention provides a mechanized tax worksheet that automatically obtains, from mainframe computer data, the data that is pertinent to bill verification, e.g., toll charges, bulk charges and other charges and credit information, automatically places those elements in a worksheet that is displayed on a computer automatically determines which charges are subject to taxing, applies the appropriate tax rate and automatically tabulates total taxes and other charges so that error free and efficient bill verification is implemented.

The present invention eliminates, almost entirely, the need for bill verifiers to manually identify and manipulate data. Accordingly, the mechanized tax worksheet of the present invention also eliminates data entry and calculation errors that can occur when bill verification is performed manually.

In a preferred embodiment of the present invention the mechanized tax worksheet operates independently from a mainframe computer that generates customer bills. Specifically, the system preferably includes an intermediate server for downloading, from the mainframe computer to a local server billing data associated with a customer account. A database is provided and is populated directly with a portion of the billing data. Other portions of the billing data undergo pre-calculation functions to simplify viewing of the data on a displayed worksheet. Taxes applicable to various charges in the billing data are thereafter automatically calculated and the results of the tax calculations are saved or stored electronically and may be displayed as desired.

After calculating the taxes independent of the mainframe computer, the calculated taxes are compared to the taxes appearing on the corresponding bill generated by the mainframe computer. In one embodiment, this comparison step is accomplished using a paper copy of a mainframe "hold" bill and comparing the tax appearing thereon to the taxes calculated by the present invention. Alternatively, the "hold" bill is scanned and its image is made available to the same computer that is displaying the independently calculated taxes. In still another preferred embodiment of the invention, the scanned image undergoes optical character recognition and the data resulting therefrom is then electronically compared to the independently calculated taxes.

It is therefore an object of the present invention to provide an automated or mechanized system and method for verifying billing accuracy.

It is also an object of the present invention to provide a system and method for comparing the billing information output from a mainframe computer and billing information generated independent of the mainframe computer.

It is also an object of the present invention to populate a database with data pertinent to bill verification and display some or all of the data on a computer.

It is also an object of the present invention to permit a user to modify data pertinent to bill verification.

It is still further an object of the present invention to electronically compare a "hold bill" and an independently calculated bill.

It is still further an object of the present invention to provide a system and method that simultaneously displays "hold bill" data and independently calculated bill data.

It is also an object of the present invention to provide a system and method for identifying errors in customer bills by independently calculating bills and storing the independently calculated bills for future use.

These and other objects of the present invention will become apparent upon a reading of the detailed description of the invention in conjunction with the accompanying drawings.

BRIEF DESCRIPTION OF THE DRAWINGS

FIG. 2 shows a tax worksheet input screen with exemplary data in accordance with a preferred embodiment of the present invention.

FIG. 3 is a services report in accordance with a preferred embodiment of the present invention.

FIG. 4 is a tax calculations results screen in accordance with a preferred embodiment of the present invention.

FIGS. 5A-5B together illustrate a summary report in accordance with a preferred embodiment of the present invention.

DETAILED DESCRIPTION OF THE INVENTION

Figure 1:
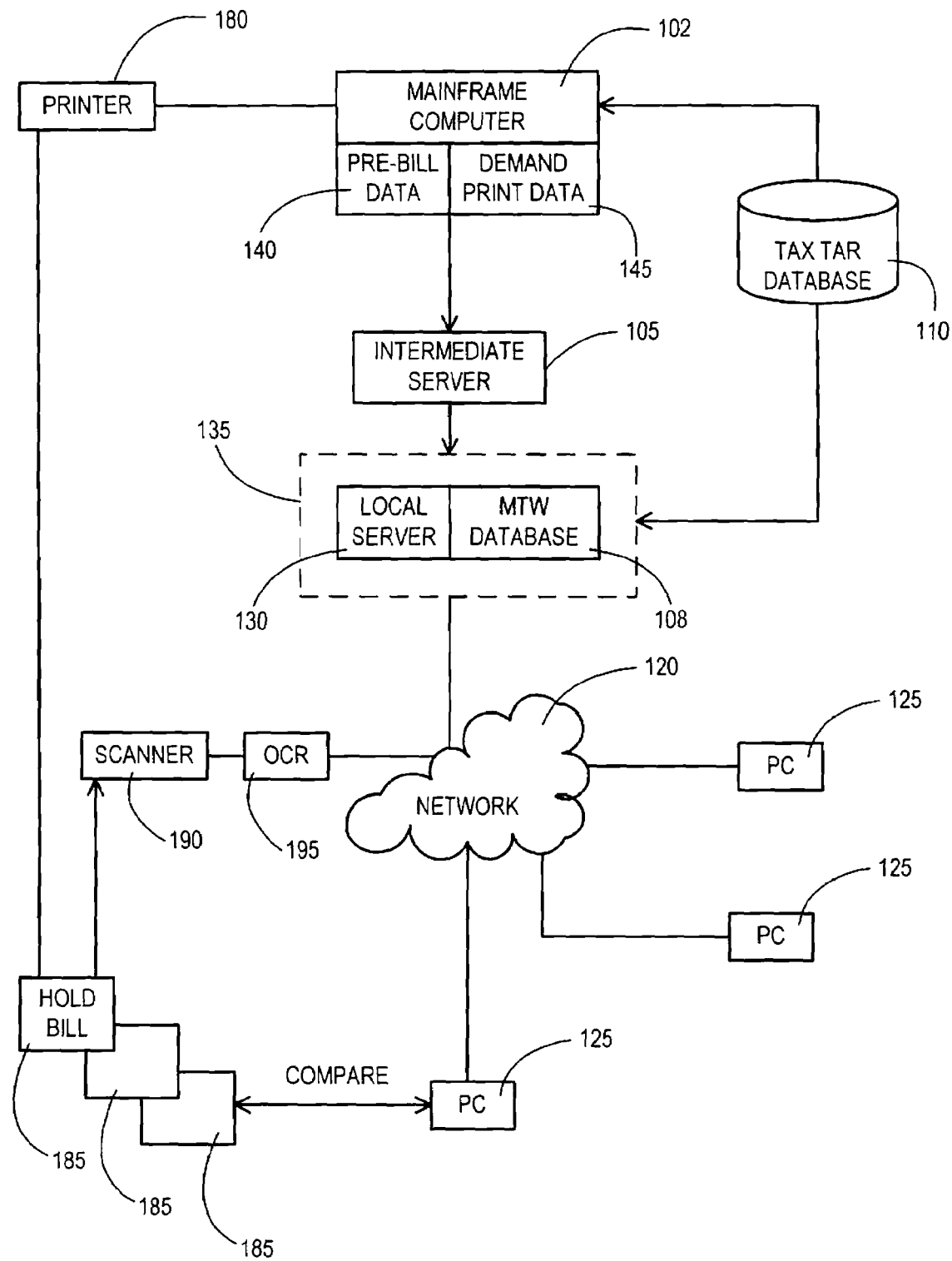
FIG. 1 is a schematic diagram of a preferred embodiment of the present invention.

FIG. 1 illustrates an implementation of a preferred embodiment of the present invention wherein a mainframe computer 102 functions as a central billing computer for a large enterprise. In the following description, a telephone company will be used as the exemplary "large enterprise". However, those skilled in the art will appreciate that the present invention is applicable to any enterprise where a relatively large number of bills must be periodically generated and a bill verification process might be desirable.

An important aspect of the present invention is the independent verification of bills that are generated by mainframe computer 102. To perform useful bill verification many of the functions of the present invention are, therefore, implemented independently of mainframe computer 102, and most preferably on a local server 130 that is in communication with several terminals or personal computers (PCs) 125 via an electronic data network 120. Data networks, such as local area networks, wide area networks and intranets and the like, which are well known in the art, are suitable for implementing data network 120. Data network 120 may also comprise the Internet, especially if bill verifiers (system users) are geographically dispersed.

In a preferred embodiment of the present invention, mainframe computer 102 periodically downloads billing information to an intermediate server 105. This billing information is stored in Mechanized Tax Worksheet (MTW) Database 108, which may be separate from local server 130 or, preferably, is coextensive with local server 130 as a single data processing machine 135 as shown. In either case, local server 130 preferably is capable of reading from, writing to and updating the data stored in MTW Database 108. Preferably, intermediate server 105 is periodically purged of the billing information received from mainframe computer 102 so that intermediate server 105 can be utilized for other functions, which may or may not be related to billing functions. That is, in the context of the present invention, intermediate server 105 may be used only for purposes of facilitating data transfer and may even be eliminated altogether if local server 130 can effectively download data directly from mainframe computer 102.

Billing for telephone usage can be divided, generally speaking, into two categories: (i) usage or toll type charges and (ii) services and other charges, other than toll/usage charges. Usage and toll type charges include, for example, long distance charges and directory assistance. On the other hand, services other than toll/usage include, for example, standard line charges, local number portability, inside wire service and trouble determination plans, call waiting and emergency 911 charges. Typically, the usage/toll type charges tend to vary during a single billing cycle, while the second category of charges tends to be more stable.

Referring again to FIG. 1, the first type of data toll/usage data, is hereinafter referred to as prebill data 140. The second, or relatively more constant billing data, is hereinafter referred to as demand print data 145. Prebill data preferably is downloaded to local server 130 and stored on MTW Database 108 on, e.g., a daily basis so that this more volatile type of billing information is as up to date as possible. More specifically, prebill data is preferably downloaded on the day that bill verification takes place. Demand print data may be downloaded less often, but preferably at a frequency sufficient to capture changes to the vast majority of accounts. Thus, demand print data 145 may be downloaded a few days before bill verification with the assumption that this data has remained constant during this time.

In addition to prebill data 140 and demand print data 145, MTW Database is also preferably loaded with tax rate information from Tax TAR (taxing area responsibility) database 110. This information preferably includes local tax rates and E911 surcharge information by TAR Code. Preferably, but not necessarily, the tax rate information that is loaded into MTW Database 108 is the same tax rate information that is supplied to and used by mainframe computer 102. This helps maintain consistency between the mainframe computer billing calculation and the bill verification calculation functions described below. Tax TAR database 110 and/or a separate revenue directory (not shown) includes information regarding which charges among the several charges contained in the prebill and demand print data files are taxable as well as the appropriate rate at which the respective charges are to be taxed.

Thus, preferably, two files are created that contain information about customer accounts that are to be sampled. A prebill file and a demand print file are downloaded to local server 130 (though not necessarily on the same day). At this point, many of the data fields in the respective files are loaded directly into MTW Database 108. For example, the account telephone number and whether the account is a residence or a business are transferred from the appropriate file to a record in MTW Database 108 without modification. On the other hand, some of the downloaded data is first processed before being stored in the appropriate records in MTW Database 108. Specifically, individual late payment charges, emergency 911 surcharges, directory advertising charges, installment billing charges and toll charges, preferably, are respectively added together so that a single numerical value only may represent, on individual lines of the tax worksheet (described below), all of these respective charges. Once the pre-calculation is complete, these data are also then loaded and stored in the appropriate MTW Database 108 records, e.g., by account number.

FIG. 2 illustrates a tax worksheet input screen in accordance with a preferred embodiment of the present invention. The several "cells" in the worksheet are preferably automatically filled in once an account number (e.g., a customer telephone number) is entered. The account number then accesses a record of billing data that has been stored in MTW Database 108 and "pulls" that data for display on the worksheet. Building such "records" in a database is well-known to those skilled in the art. The following description of the features of the worksheet of the present invention also provides a more detailed description of the data that is downloaded from mainframe computer 102.

In accordance with a preferred embodiment, the present invention is implemented in Visual Basic. However, any programming language suitable for providing a user interface to a relational database, i.e., MTW Database 108 may also be used.

Referring now to FIG. 2. the tax worksheet of the present invention includes a menu 210 at the top portion of the worksheet. Menu item "MTW" has a drop down option (not shown) for exiting the worksheet. The next menu item entitled "Operations" includes menu options to "Apply Full Rate" for over-riding a discounted rate, "Calculate Taxes" for initiating the application of the taxing rates to the various charges and summing the taxes, "Review Tax Results" which changes the displayed worksheet to a tax calculations results screen (FIG. 4), and "Erase All Data" which erases all the data on the input screen and thereby prepares the worksheet for a new telephone/account number.

Under the "Settings" menu, there are options for "Calculate Taxes First," which causes the mechanized tax worksheet to jump directly to the tax calculations results screen (FIG. 4) instead of first showing the data that is displayed in the tax worksheet input screen of FIG. 2, "Auto-Fill Services," which allow input of data with all fields being duplicated except, preferably, for the rate field, and "Remarks Preferred," which allows input in the remarks column. Finally, the "About" menu item preferably provides details regarding the current version of the mechanized tax worksheet of the present invention.

Area 220 includes a box for the account number which corresponds to the account telephone number. There are also boxes for tax exemption indicators (tax codes) for the account entered, whether the account is a residence or a business and when the next bill period date of the account is.

Boxes in information area 230 include highlighted symbols that indicate whether (i) the screen is permitting remarks to be input, (ii) data is being automatically filled (except preferably the rate field), (iii) whether the worksheet is in edit mode (in the edit mode a user can edit or modify the data in any field), and (iv) whether to calculate taxes using historical tax rates instead of current tax rates (RCATS—refund calculation and tracking system), e.g., if a refund is due for a charge for which the tax rate has now changed.

Function buttons 240 include a calculate and a review button. If calculate is depressed, the summable fields (e.g., rate field) are added together and if the review button is depressed, the screen changes to the tax calculations results screen of FIG. 4. Function box 250 includes an "erase all" button which erases all the current data and presents a refreshed mechanized tax worksheet input screen and an "exit MTW" button which closes out the program entirely. Preferably, when the "exit MTW" button is pressed a dialogue box (not shown) appears which asks the user whether he would like to save the worksheet. If yes, the data in the worksheet is saved in a conventional manner.

The main portion of the mechanized tax worksheet input screen (FIG. 2) includes several columns with headings of "type," "entity," "Tar/Geo," "remarks," "from, thru," "A/C" and "rate." The fields in the type column may, for example, be one of the following:

| | |
|---|---|
| B | Bill total |
| C | Optional calling services |
| D | DA charges |
| I | IDB charges - regulated |
| IU | IDB charges - unregulated |

-continued

| | |
|---|---|
| L | Local usage |
| M | RCATS |
| N | Non-fractional charges & credits |
| P | Past balance due |
| R | Recurring charges & credits |
| T | Tolls |

The entity column represents, in this case, the telephone company that is providing service to the customer. Thus, the entity is the billing entity or, in the case of telephone companies, the carrier. The Tar/Geo column indicates the Tar code or Geographic code that represents the city and county of the account, as is well known in the art. The remarks column preferably includes a USOC (universal service operations code) or some other brief description of the charge. In FIG. 1, the following USOCs are used:

| | |
|---|---|
| 1FRL | Residential line |
| LNPCX | Local number portability |
| BCR | Secondary CO feature - recurring |
| BRD | Secondary CO feature - recurring |
| NXMCR | Secondary CO feature - recurring |
| AH8KC | Kentucky TRS hearing impaired surcharge pass on |
| SEQ1X | Inside wire service plan |
| TDG | Trouble determination plan |
| 8SCRB | State universal service fund |
| 9LM | Interstate CALC (end user common line charge) |
| VR3CL | Residence line |
| VSB | Secondary CO feature - recurring |

The "from" and "thru" columns are used to bound the dates over which certain other charges and credits (OC&Cs) are fractionalized.

The next column in the mechanized tax worksheet is entitled A/C, or account code, for the particular line item. The account code preferably is an internal account code used by the billing entity. Finally, the rate column lists the amount of charge or credit for the particular line item.

FIGS. 3 through 5 illustrate exemplary reports that are output by the mechanized tax worksheet of the present invention. Specifically, FIG. 3 is a services report which provides details of what has been entered into the system for a particular account. In this case, FIG. 3 has data that corresponds identically to FIG. 2.

FIG. 4 illustrates a breakdown of the tax calculations results implemented by the mechanized tax worksheet of the present invention. Specifically, as can be seen in FIG. 4, the tax is broken down by federal, state, county, city and franchise. These taxes are calculated using taxing information provided by Tax TAR database 110 or tax tables stored within MTW Database 108. Near the bottom of the tax results report of FIG. 4 are regulated and unregulated totals as well as a total billed line. FIGS. 5A and 5B show a summary report that is also generated by the mechanized tax worksheet of the present invention. This summary report preferably is used to compare the several independently calculated charges with the charges appearing on the bill calculated by mainframe computer 102, i.e., hold bill 185.

Specifically, in one preferred implementation, as shown in FIG. 1, mainframe computer 102 is in communication with printer 180. This printer preferably prints several hold bills 185 that correspond to accounts that have been downloaded via the prebill and demand print data 140/145. Then, after the download process and tax calculation that is completed by the mechanized tax worksheet of the present invention, the bill verifier (user) compares the charges on the hold bills to the charges that have been independently calculated by the present invention. If any inconsistency is apparent, then the bill verifier preferably then determines the source of the error, which may be algorithms, etc., run on mainframe computer 102 or calculation performed by the mechanized tax worksheet of the present invention. Once the bill verifier/user determines that all inconsistencies have been resolved, then the hold bins may be "released" thereby permitting release of the complete batch of bills that were held for purposes of verification.

In another preferred embodiment of the present invention, the printed hold bills are scanned by scanner 190 and the digital images thereof are made available to network 120. Then, these digital images are preferably displayed in split screen format on PC 125 along with, for example the summary report of FIGS. 5A and 5B. Thus, in this second preferred embodiment, the bill verifier need not handle any papers but instead, can accomplish his function using only a screen of PC 125. Of course, two screens may be used, either on the same PC 125, or using two separate PCs.

In still another preferred embodiment of the present invention, optical character recognition (OCR) software 195 is provided in connection with the scanner whereby the data on the hold bill can be stored electronically. Then, the "compare" function that the bill verifier himself performed in the previous embodiment, can, instead, be accomplished directly by the present invention by performing electronic data comparisons.

In another embodiment of the present invention, instead of printing hold bills 185 via printer 180, the data files in mainframe computer 102 that ultimately are used to generate the printed hold bills 185 are separately downloaded to local server 130 and made available to network 120. Then, instead of comparing a printed version of the hold bill to the independently generated verification bill, an electronic data comparison can be performed between the two data files, namely, the data files from mainframe computer 102 and data files that store the information for, for example, summary report of FIGS. 5A and 5B. In this embodiment, the entire process is fully automated whereby a printing step and a manual verification step are eliminated.

A useful by-product of the present invention is that users of the present invention can easily be trained to learn the necessary tax information to properly work as a bill verifier. Specifically, the present invention, since it is implemented on a PC network can easily store individual worksheets that have been calculated. Accordingly, if a relatively new user of the present invention has a question regarding a possible error generated by the mainframe computer, the user can save the worksheet and that worksheet can then be brought up on another computer, and even at a later date, for discussion and education purposes.

Further, the present invention can be used to manually enter data to verify taxing or fractionalization outside of the described automated download process. This is a very useful tool for quick checking of tax issues.

The foregoing disclosure of embodiments of the present invention and specific examples illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. Thus, the scope of the invention is to be defined only by the claims appended hereto, and by their equivalents.

What is claimed is:

1. A method of verifying tax charges on a batch of customer telecommunications bills, comprising:
    downloading, from a mainframe computer to a local server, billing data associated with customer accounts, wherein the billing data includes prebill data that is downloaded on a day of verification and demand print data that can be down loaded prior to the corresponding prebill data;
    populating a first database with a first portion of the billing data;
    performing pre-calculation functions on a second portion of the billing data and further populating the first database with results of the pre-calculation functions;
    providing an option to a user for immediately calculating calculated tax results without displaying predetermined categories of information stored in the first database;
    independently of the mainframe computer, calculating calculated tax results for each of several charges in the billing data utilizing the billing data populated in the first database and local tax rates and stored tax rate information;
    comparing the calculated tax results displayed within the worksheet with the tax charges on the customer telecommunication bills to verify the telecommunication bill taxes; and
    resolving errors on the customer telecommunications bills detected from the comparing printing and sending the bills to customers.

2. The method of claim 1, wherein the pre-calculation functions include summing toll telephone charges.

3. The method of claim 1, wherein the predetermined categories describe elements of individual charges.

4. The method of claim 1, further comprising displaying predetermined categories of information stored in the database.

5. The method of claim 4, wherein the computer is in communication with an electronic data network.

6. The method of claim 1, further comprising loading the first database with tax rate information.

7. The method of claim 1, further comprising electronically saving the tax results.

8. The method of claim 7, further comprising utilizing the calculated tax results for resolving questions.

9. The method of claim 1, wherein the local server and the first database are integrated in a single machine.

* * * * *